United States Patent
Heckman et al.

(10) Patent No.: US 12,363,358 B2
(45) Date of Patent: Jul. 15, 2025

(54) PROCESSING OF VIDEO OPERATIONS AS SUBTASKS FOR VIDEO FRAGMENTS

(71) Applicant: Microsoft Technology Licensing, LLC, Redmond, WA (US)

(72) Inventors: Nicholas Tegan Heckman, Kirkland, WA (US); Steven Craig Peterson, Bloomington, MN (US); Nitin Suri, Redmond, WA (US); Jason Allen Whitehouse, Lisbon (PT)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 17/843,549

(22) Filed: Jun. 17, 2022

(65) Prior Publication Data

US 2023/0412855 A1 Dec. 21, 2023

(51) Int. Cl.
*H04N 21/234* (2011.01)
*G06F 11/07* (2006.01)
*H04N 19/48* (2014.01)

(52) U.S. Cl.
CPC ........ *H04N 21/234* (2013.01); *G06F 11/07* (2013.01); *H04N 19/48* (2014.11)

(58) Field of Classification Search
CPC ...... H04N 21/234; H04N 19/48; G06F 11/07; G06F 11/0793; G06F 9/5044
See application file for complete search history.

(56) References Cited

U.S. PATENT DOCUMENTS

| | | |
|---|---|---|
| 11,106,495 B2 | 8/2021 | Voss et al. |
| 2016/0034306 A1* | 2/2016 | Galdy ............ G06F 9/4881 718/104 |

FOREIGN PATENT DOCUMENTS

CN 112181657 A 1/2021

OTHER PUBLICATIONS

"International Search Report and Written Opinion Issued in PCT Application No. PCT/US23/019722", Mailed Date: Jul. 6, 2023, 10 Pages.

* cited by examiner

*Primary Examiner* — Joseph W Becker
(74) *Attorney, Agent, or Firm* — Klarquist Sparkman, LLP

(57) ABSTRACT

Techniques and solutions are described for executing a video processing task. A video processing task is received that includes one or more operations to be performed on a digital video file and an identifier of the digital video file. The video processing task is divided into subtasks of operations to be performed on fragments of the video, such as fragments having a particular duration. The duration can correspond to a duration used for video streaming Compared with video processing that is performed as a single task, disclosed techniques can provide improved fault tolerance, as only failed tasks need to be reprocessed. Video processing subtasks can be distributed to a plurality of workers, which can further improve fault tolerance, and can increase the computing power available for video processing, including allowing for the use of heterogenous or unreliable workers.

20 Claims, 8 Drawing Sheets

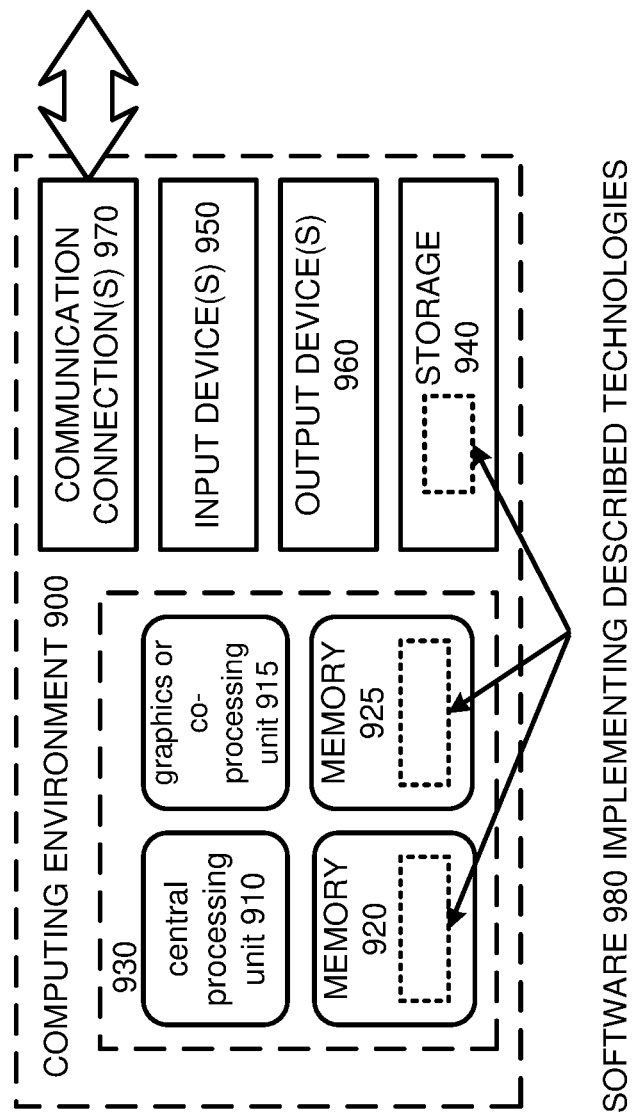

PROCESSING OF VIDEO OPERATIONS AS SUBTASKS FOR VIDEO FRAGMENTS

FIELD

The present disclosure generally relates to video processing. Particular implementations provide for processing of operations specified for a video on fragments of the video, instead of as operations performed on an entire video file.

BACKGROUND

From its beginning in the early 1990s, video streaming has become an enormously popular use of the internet and has disrupted entire industries—gone are the days of renting VHS tapes or DVDs from the local rental store. As computers become smaller and more powerful, video streaming has migrated from desktop and laptop applications to being a major use of tablets and smartphones.

Despite improvements in general computing hardware, and in networking technologies, video streaming remains highly resource intensive. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for executing a video processing task. A video processing task is received that includes one or more operations to be performed on a digital video file and an identifier of the digital video file. The video processing task is divided into subtasks of operations to be performed on fragments of the video, such as fragments having a particular duration. The duration can correspond to a duration used for video streaming Compared with video processing that is performed as a single task, disclosed techniques can provide improved fault tolerance, as only failed tasks need to be reprocessed. Video processing subtasks can be distributed to a plurality of workers, which can further improve fault tolerance, and can increase the computing power available for video processing, including allowing for the use of heterogenous or unreliable workers.

In one aspect, a method is provided for dividing a video processing task into a plurality of subtasks performable by one or more worker computing devices. A video processing task is received that includes an identifier of a digital video file and one or more operations to be performed on at least a portion of the digital video file. A plurality of subtasks are generated for processing the one or more operations. A given subtask of the plurality of subtasks identifies, or includes, a fragment of the digital video file to be processed as part of the subtask.

At least a first portion of the plurality of subtasks are scheduled to one or more worker computing devices. Subtasks of the at least a first portion of the plurality of subtasks are sent to respective worker computing devices to be processed by the respective worker computing device, thereby providing improved fault tolerance for a video processing task as compared with executing the video processing task as a single task.

In another aspect, a method is provided for executing a video processing subtask by a worker computing device. A subtask of a video processing task is received from a coordinator computing system. The subtask includes one or more operations of the video processing task, or instructions derived at least in part therefrom, and an identifier of a video fragment to be processed for the subtask. At least the video fragment is requested. The at least the video fragment is received. The operations or instructions are executed on the at least the video fragment. The at least the video fragment is encoded after, or in conjunction with, the executing the operations or instructions to provide a processed video fragment.

In a further aspect, the present disclosure provides an alternate method of executing a video processing subtask by a worker computing device. A subtask of a video processing task for a digital video file is received from a coordinator computing system. The subtask includes one or more operations of the video processing task, or instructions derived at least in part therefrom, and a video fragment to be processed for the subtask. The operations or instructions are executed on the at least the video fragment. The at least the video fragment is encoded after, or in conjunction with, the executing the operations or instructions to provide a processed video fragment. The processed video fragment is streamable to a streaming client without further processing of the processed video fragment. The processed video fragment is sent to a repository comprising other processed video fragments of the digital video file.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 9 is a diagram of an example computing system in which some described embodiments can be implemented.

DETAILED DESCRIPTION

Example 1—Overview

Figure 1:
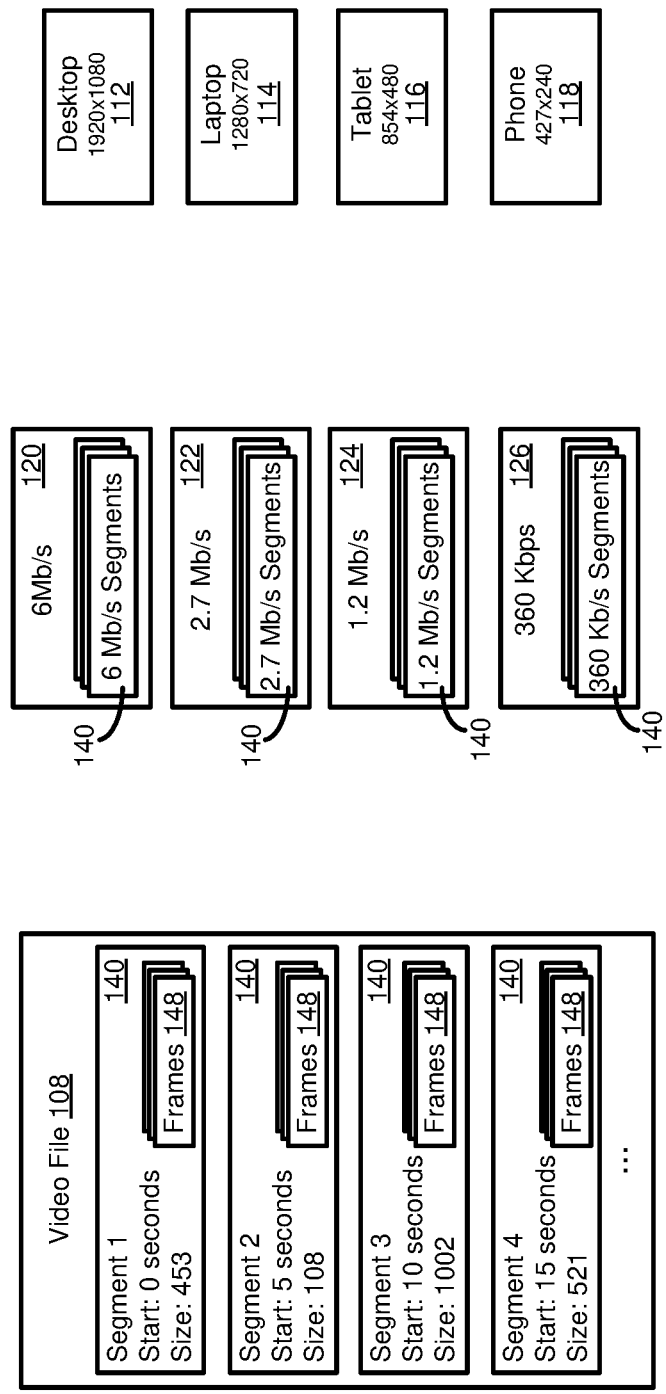
FIG. 1 is a diagram illustrating a computing environment supporting video streaming, including at different video quality levels.

From its beginning in the early 1990s, video streaming has become an enormously popular use of the internet and has disrupted entire industries—gone are the days of renting VHS tapes or DVDs from the local rental store. As computers become smaller and more powerful, video streaming has migrated from desktop and laptop applications to being a major use of tablets and smartphones.

Despite improvements in general computing hardware, and in networking technologies, video streaming remains highly resource intensive. Accordingly, room for improvement exists.

Video processing operations can be carried out in response to instructions to trim a video, to apply effects to a video, to add transitions or text to a video, to merge different video files, or to resequence portions of a video. Other example operations can result from instructions to rotate all or a portion of a video, alter the color profile of a video, apply filters, or adjust color levels in a video. Typically, these types of operations are applied to an entire video file, which can create a number of issues.

One issue that can arise is process failure, such as because of a hardware or software issue (e.g., failure) on a device that is processing particular instructions. If failure occurs, it is often necessary to restart the entire video processing operations, which consumes additional time and computing resources.

Even if failure does not occur, carrying out video processing on a single computing device, processing an entire video file, can be suboptimal. Video processing can be resource intensive, potentially resulting in lengthy processing times, and reducing computing resources available for other processes. Further issues can arise, such as if the processed video is to be used for streaming. In this case, typically the operations are applied to a source file to produce a target file. For streaming, the target file is typically processed to produce smaller video segments that can be sent during streaming. However, having a first coding step to apply video processing operations, and a second coding step to generate segments for streaming, can reduce video quality. That is, video coding techniques are typically "lossy," meaning that video quality is decreased as a result of the coding operations.

While video files are often segmented in some manner, the segmentation typically involves having separate data streams for video, images, text or subtitles, and metadata. Particularly since video data forms the bulk of a video file, even separate processing of these separate data streams does little to ameliorate the issues discussed above.

Disclosed innovations can address the issues noted above, by splitting a source video file into separate video segments and then applying operations to implement instructions on the individual segments, rather than on the entire video as a single operation/task. In some cases, some or all of such video segments can be processed using a single computing device. As compared with processing an entire video file, even processing all video segments at a single computing device can be advantageous. One advantage is fault tolerance. If a computing process or hardware failure occurs, segments which have completed processing can be maintained, and so only segments that were actively undergoing processing when failure occurred need be reprocessed.

In addition, processing a video in terms of individual segments can allow a computing system to more flexibly schedule video processing operations. If a higher priority task is scheduled, processing of video segments can be delayed, or allocated fewer computing resources (such as allocating less memory, and reducing scheduling of segment processing operations on a computer processor).

Disclosed techniques include segmenting (or splitting) a source video into segments that correspond to units used for streaming, such as segments of a determined duration. By providing segments in the same form as needed for streaming, an extra coding step is avoided, which both reduces computing resource use and processing time, and provides improved video quality by avoiding an additional coding operation. However, in other cases, additional processing can be performed on processed video fragments produced using the disclosed techniques, including combining the fragments into larger video portions, or even a complete video.

The above advantages apply with equal force to situations where some or all of the video segments are distributed to multiple worker computing systems or devices. Having multiple worker devices provides improved fault tolerance, as if a device fails, only the segment or segments allocated to that device need be reprocessed, and can be allocated to a different worker device if the originally assigned worker is not available. Because of this fault tolerance, a greater variety of worker devices are available to perform video processing operations, including devices that might be unreliable, such as devices that might lose connectivity, at a given time (when a subtask is to be performed) have insufficient computing resources to perform processing operations (including because they are performing higher-priority tasks), or otherwise become unavailable. Worker devices can also be used that may have sufficient capabilities to process video segments, even if they would be incapable of performing the operations on an entire video file.

The nature of the worker devices can also differ, including have worker devices with different form factors or levels of computing resources—smartphones, tablets, laptops, personal computers, servers, cloud computing systems, or other types of computing system or devices can all be part of a distributed video processing task. Similarly, the worker computing devices can perform the operations in different ways, such as having some devices where coding operations are performed in software, while other devices perform some or all operations in hardware.

Distributing subtasks of an overall video processing task to multiple computing devices can thus make a greater amount of computing resources available, which can reduce the processing load on any one worker, and can speed processing time. Further, additional prioritization and flexibility is provided, as a central orchestrator can flexibly assign or reassign subtasks, including based on the availability of worker devices. The orchestrator can also prioritize different distributed video processing tasks. As an example, some video processing tasks produce video segments that are stored and streamed upon client request. Other video processing tasks encode segments only when requested, where the segments can optionally be cached for future use. If a "just in time" coding request is received, the orchestrator can prioritize that task/its component subtasks, including delaying processing of existing subtasks, engaging more workers, or assigning higher priority tasks to more performant workers (that is, workers that might be more reliable, have greater throughput, etc.).

Example 2—Example Video Streaming Environment

FIG. 1 illustrates generally how a source video file 108 can be provided in a variety of quality levels to different consuming devices, such as a desktop computer 112, a laptop 114, a tablet computing device 116, and a smartphone 118. The consuming devices 112, 114, 116, 118 can differ in a number of ways, including screen size, which can also be reflected in resolutions that are most useable on the consuming devices. The consuming devices 112, 114, 116, 118 can also differ in available computing resources, such as storage, memory, processor specifications, and expected network communication speeds.

Traditionally video streaming services are available to a variety of consuming devices, and provide different versions of the source video file 108 for streaming Typically, higher resolutions and bitrates are used for more powerful consuming devices. However, for any device, it can be beneficial to allow consuming devices to switch streams (bitrates) as conditions change.

As shown, four versions of the source video file 108 are available, either having already been encoded or being made available (such as by transcoding) using just in time encoding techniques. For this example, assume that video streams of resolutions 1080p, 720p, 480p, and 240p are to be made available, which correspond respectively to streams 120, 122, 124, 126. Each stream 120, 122, 124, 126 is associated with a particulate bitrate, which can be a standard bitrate or a bitrate that is otherwise selected for a particular stream quality. As shown, the streams 120, 122, 124, 126 are associated respectively with bitrates of 6 Mb/s, 2.7 Mb/s, 1.2 Mb/s, and 360 Kb/s.

Each of the streams 120, 122, 124, 126 is associated with a respective plurality of segments 140, which are encoded using the bitrate associated with the respective stream. In some cases, the segments 140 actually have the bitrate of the respective stream 120, 122, 124, 126, while in other cases the bitrate can vary, such as if the stream bitrate is expressed as a target bitrate for a video encoder. That is, the video encoder may use the provided bitrate as a target, but may produce segments having a bitrate that differs from the target based on other considerations used by the video encoder.

The segments 140 correspond to segments of the source video file 108. The segments 140 include a plurality of frames 148. The frames 148 can correspond to frames used in video playback. For instance, if playback is specified at 30 frames/second, and each segment 140 is five seconds in duration, then each segment includes 150 frames.

As explained in Example 1, typically any modifications to a video file are performed on source video, and then the segments 140 are generated. This can result in degradation of the source video, which is decoded and then reencoded as individual segments, which adds an additional coding operation that will provide some quality degradation in addition to degradation that occurred during the decoding/reencoding of the source video in processing the modifications. In addition, the process of coding the modified source video to produce the segments 140 introduces additional delay in having the segments available for streaming, and uses additional computing resources.

Example 3—Example Video Stream Components

Figure 2:
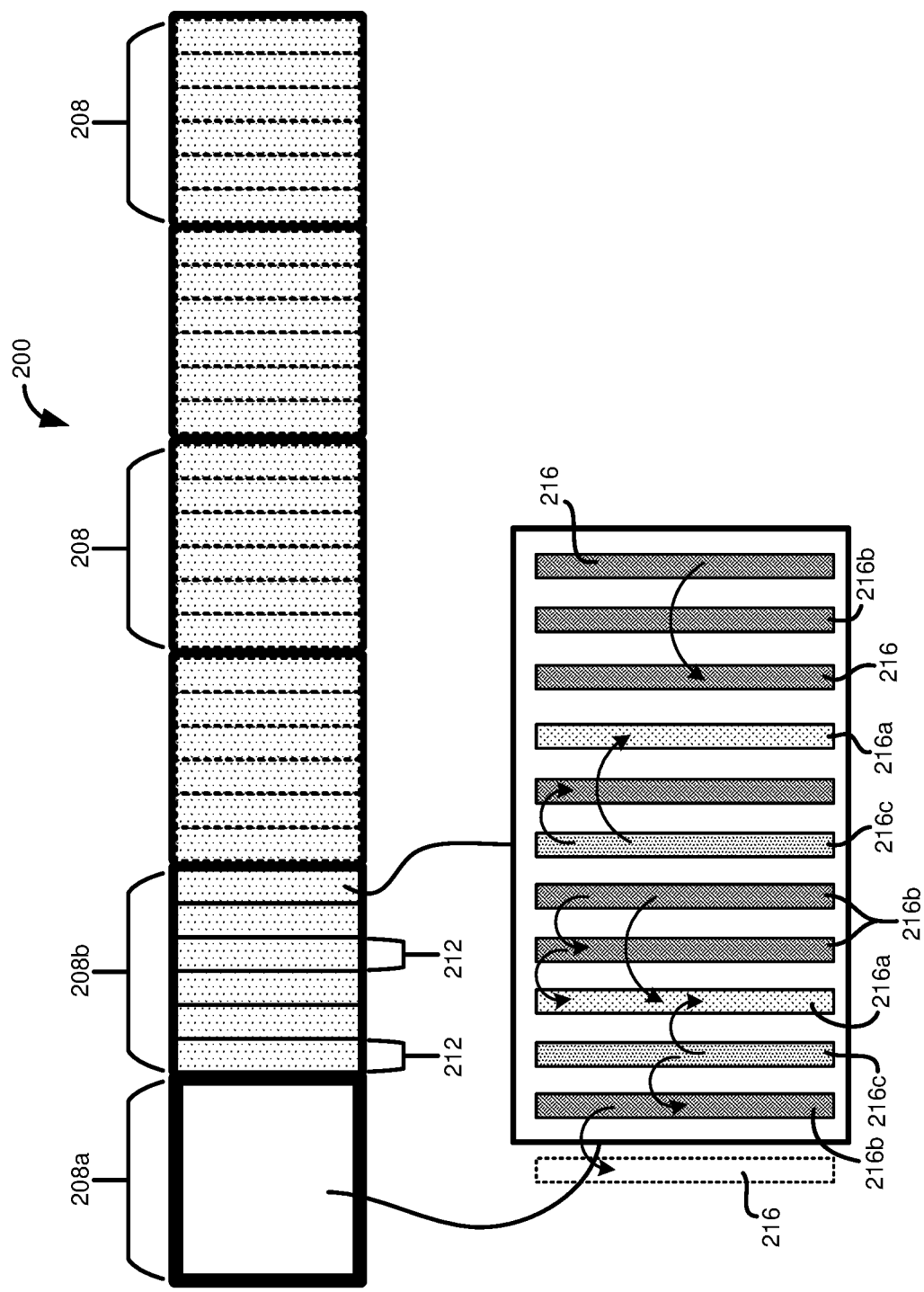
FIG. 2 is a diagram illustrating components of a streaming video, such as video comprised within an MP4 container.

FIG. 2 provides a simplified representation of a streaming video file 200, or more particularly a container, such as an MP4 container, and content included in such container. The streaming video file 200 includes a plurality of segments 208, generally, where segments 208a, 208b represent different types of segments, discussed further below. The segments 208 can correspond to the segments 140 of FIG. 1. The segments 208 are typically of a determined duration, including of a fixed duration, typically a duration of 1-10 seconds, although other durations can be used, and optionally segments can be of different durations.

The segments 208 can optionally be further broken down into smaller units 212, which can be referred to as chunks. Note that the term "chunk" is sometimes used to describe the segments 208. Unless indicated otherwise, the term "segment" refers to the segments 208—typical units of streaming, including for adaptive streaming (such as MPEG-DASH and HLS using fMP4). The term "chunk" refers to a portion 212 of a segment, which is consistent with how the term "chunk" is used in techniques such as MPEG-CMAF (Common Media Application Format).

To represent the two possibilities, a segment 208a is shown as having chunks 212, while segments 208b is shown without chunks. Typically, a single video streaming file will be available as either having segments 208a or segments 208b, but not both, although the disclosed techniques do not prohibit the used of mixed segment types. When chunks 212 are available, they can be used as a unit of streaming, in addition to, or in place of, the segments 208, while the segments 208 serve as the unit of streaming if the segments are not further divided into chunks. The term "fragment" refers to any contiguous portion of a video file that is produced by splitting a source file into contiguous portions, where a collection of fragments can represent the entire source video, or can represent a selected portion of the source video.

A given segment 208, or a chunk 212 thereof, typically includes a plurality of frames, 216 (including frames 216a-216c, having differing types, as discussed further below). For instance, assume a segment 208 has a duration of five seconds, and a framerate of 24 frames/second is used for the video. In that case, the segment 208 includes 120 frames 216. Now assume that a segment 208 is divided into chunks 212 having a duration of one second. The segment 208 still includes 120 frames 216, but each chunk 212 includes 24 frames.

Regardless of whether frames 216 are considered as being in a segment 208, a chunk 212, or a video file that has not been processed into segments or chunks, the frames are typically (but are not required to be) of different types. That is, common video compression techniques achieve video compression by omitting information for certain frames 216. That is, some types of frames 216 can be decoded without the presence of other frames, but other types of frames may require additional frames in order to be decoded. Frames 216 that can be decoded independently of other frames are commonly referred to as "i-frames" (or "key frames"), and are represented as frames 216a. Because they do not require other frames 216 to be decoded, i-frames 216a are typically the least compressible frame type.

Another type of frame 216, shown as frames 216b, are referred to as "p-frames" (predicted frames) and the decoding of a p-frame requires one or more past frames. A further type of frame 216, shown as frames 216c, are referred to as "b-frames" (for "bi-directional"), which refers to a frame where either or both of frames before or after a current b-frame are used to decode the current b-frame. Accordingly, if a first frame 216 in a segment 208 is a p-frame 216a, additional information will be needed to decode the frame. Similarly, if a particular subset of a segment 208 is to be used (either as part of a chunk 212 or otherwise), at least one i-frame will be needed if the subset starts with a p-frame 216b. Similar considerations may apply if the first frame 216 is a b-frame 216c.

Note that while the dependencies of the frames 216 has been described for segments 208, the same issues exist in non-segmented video files. Further, the dependencies can be more complex than described above. For instance, both p-frames 216b and b-frames 216c can depend on multiple prior frames (or multiple prior and/or multiple future frames, in the case of b-frames). Further, dependencies between frames need not be sequential. For example, a sixth frame in a frame series may depend on a second frame in the frame series but not on a third frame in the series.

Disclosed techniques provide for applying video processing operations on discrete video sub-sections, such as segments 208 or chunks 212. Depending how the distribution of frame types within the video aligns with the boundaries of segments 208 or chunks 212, it is possible that frames needed to decode the segment or chunk may be in a different segment or chunk. In the case where a video is being coded into segments 208 or chunks 212 on a single computing system or device, dependencies between frames are typically not an issue, because any needed frames are available to the decoder/encoder. However, when a video processing task is divided into subtasks, it is possible that a unit of work assigned to a particular worker device may not include all required frames 216. As will be further described, at least in some implementations, a worker can request, or be sent, additional frames 216 beyond the specific frames included in the unit of work.

Many video container formats contain information that can be leveraged by disclosed techniques. Specific details are provided for the MP4 container, but similar principles can apply to other container formats. The MP4 container includes a "stsc" "atom" or "box" (where atoms/boxes are units into which metadata is organized), which can be used to locate a segment (or chunk) that contains a particular frame/sample. An "stts" atom/box contains information correlating a particular time of a media (e.g., video) file to a particular sample (or set of samples, which can correspond to the granularity of time unit supported—such as having a set of 24 frames for a granularity of one second and a framerate of 24 frames/second) associated with that time. Other useful atoms/boxes include the "stsz" atom, which includes information about the size of each sample. A "stco" box provides offsets of segments/chunks in the video data/media stream. Other atoms/box include information such as the duration of the video, number of samples, data format, timescale, display characteristics, etc.

A coordinator computing system that orchestrates video processing subtasks, or workers processing the subtasks, can use the above-described information for a variety of purposes, including to locate particular portions of video data (frames, segments) needed for a subtask. The method of accessing/obtaining video data can differ depending on the type of container or the particular implementation of a container. For instance, some containers support random access of the video, such as the MP4 container, which can include an "stss" atom that provides "sync-samples," which are random access frames. If random access information is not provided (or if a default is not that all frames are random access), byte offset information can be used to delineate and request a portion of a video needed for a subtask.

Figure 3:
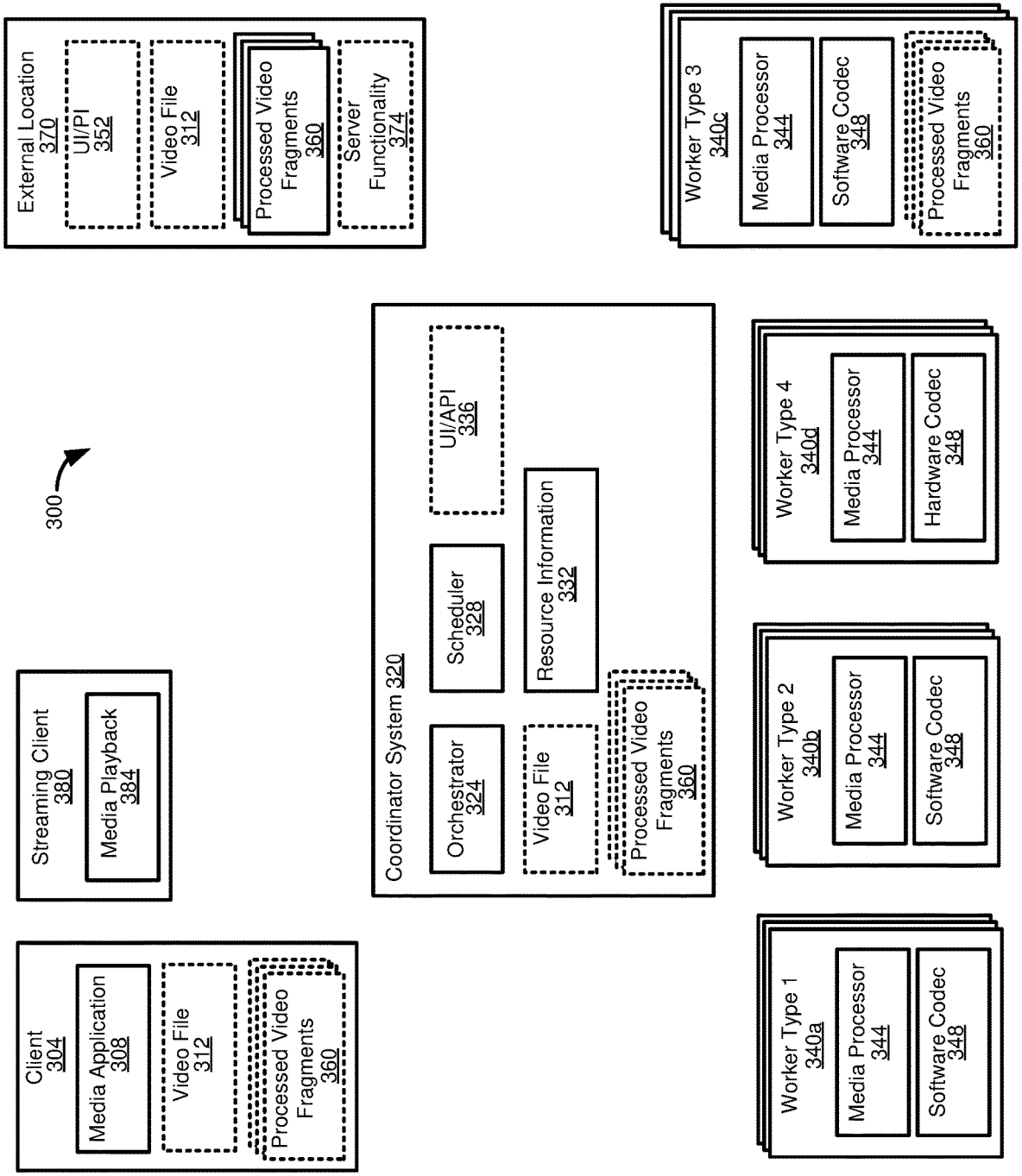
FIG. 3 is a block diagram illustrating an example computing environment in which disclosed techniques can be implemented, including a coordinator computing system a worker computing systems.

Example 4—Example Computing Environment with Coordinator Computing System and Workers for Subtask Execution FIG. 3 illustrates a computing environment 300 in which disclosed techniques can be implemented. It should be appreciated that the disclosed techniques can implemented in a variety of computing environments, and thus the disclosed techniques need not be used in an environment that includes all of the components of the computing environment 300. Additionally, components not shown in the computing environment 300 can be used in conjunction with disclosed techniques. Because of the variety of ways in which the disclosed techniques can be implemented, a number of components, end elements thereof, are shown as being optional (indicated by dashed lines).

Generally, the computing environment 300 includes a client that submits a video processing request that includes (or indicates) one or more video files and one or more instructions/operations to be performed on the one or more video files, an orchestrator that is responsible for generating and sending subtasks to workers, and workers that apply the instructions/operations to portions (fragments) of the one or more video files. A given computing device can include a single component, or multiple components, or can include all components.

The computing environment 300 includes a client 304, where the client generates a video processing request the includes an indication of one or more video files and one or more operations/instructions to be performed on the or more video files. The client 304 can include a media application 308, such as a video editor, that can be used to identify the one or more video files and to specify the operations/instructions to be executed thereon. The request sent by the client 304 may or may not include the actual video data to be processed.

While the media application 308 is shown as being on the client 304, the media application 308 can be hosted on another computing device. For instance, the media application 308 can be a web-based application, in which case a client's web browser, for example, along with the remote media application, can serve as the media application 308. Similarly, the client 308 is shown as optionally storing a video file 312. However, the video file 312 can be located externally to the client, and the client can supply a location of the video file, or other means of accessing the video file, when generating a task using the media application 308.

A coordinator system 320 is shown as including an orchestrator 324. The orchestrator 324 receives and processes video processing requests, such as requests received from the client 304. The orchestrator 324 analyzes the video file 312 and generates video processing subtasks, including splitting video data into fragments to be processed as part of a given subtask. The video file 312 be stored on the client 304, the coordinator system 320, or at another location, such as on a computing device that serves as a worker 340 (of workers 340, which are shown as workers 340a-340d), or in a media repository (including a location on the internet).

Video processing subtasks can be implemented in a variety of manners. A given subtask operates on a fragment of the video file 312, such as a portion of the file corresponding to a unit of streaming. In particular implementations, the portion of the video file is determined as/using a duration, such as generating subtasks for five-second sections of the video file 312.

However, subtasks can optionally be specified in other manners, such as a number of frames or a number of bytes of video data to process, where these specifications can correspond to a particular video duration, or can be the "primary" criteria. That is, a number of bytes in a subtask can be determined by calculating the number of bytes in a portion of the video file 312 corresponding to a specified video duration. Or, a number of bytes can be specified, where the duration is determined based on a number of frames whose data is included in the specified bytes.

For example, assume a subtask is specified for 788 kB of video file data, and that this corresponds to 48 frames of video. If the video has a framerate of 24 frames/second, then duration of the video portion for the subtask is two seconds. A different 788 kB portion of the video file 312 can also correspond to a two-second excerpt of the video, or the duration can be longer or shorter (as video excerpts of higher complexity may have more data, while video excerpts having lower complexity may have less data).

Subtasks can be defined considering an overall desired output of a video processing task. For instance, if an operation is to trim five seconds from the beginning of a video, the subtasks can be to encode video file portions (such as segments or chunks) starting with the sixth second of the video file.

Subtasks are assigned to one or more of the workers 340. However, the coordinator system 320 can also serve as a worker 340, and can process some or all of the subtasks. Similarly, while useful implementations of the disclosed techniques involve multiple workers 340, disclosed techniques can provide advantages even if a single worker executes subtasks, whether that worker is the coordinator system 320 or is a worker that is external to the coordinator system.

Typically, assigned subtasks are sent to workers 340 by the coordinator system 320, although the disclosed techniques can be used in situations where workers check with the coordinator system for assigned subtasks. Similarly, data to be used in executing a subtask can be sent to workers 340 by the coordinator system 320, can be requested from the coordinator system by the workers 340, or a combination thereof. For instance, the orchestrator 324 can send a worker 340 instructions to be performed on a fragment of the video file 312, and the worker 340 can then request appropriate data of the video file 312, regardless of where it is stored, including video data of the video file or metadata data describing the video file 312. These implementations can be particularly useful when protocols used to communicate between the orchestrator 324 and the workers 340 do not support a payload size sufficient to contain all of the data needed for a processing subtask. Even for metadata of the video file 312, the orchestrator 324 can send to a given worker 340 no metadata, all metadata, or a portion of metadata associated with the video file, where the worker can independently request any additional metadata needed to execute the subtask.

As disused in conjunction with Example 4, it is possible that a portion of the video file 312 needed to carry out a particular subtask may not be sent to a worker 340, or included with a fragment of the video file explicitly identified as part of the subtask. That is, frames appearing in a beginning portion of the video file fragment, such as p-frames, may refer to frames (such as i-frames or other p-frames) outside of the frames included within the subtask. Or, frames appearing in an ending portion, such as b-frames, of the video fragment may refer to frames outside of the frames of the subtask (such as i-frames or other b-frames).

If it is determined that additional frames are needed, a codec 360 of the workers 340 can determine that additional frames are needed, and can request such additional frames from the orchestrator 234 or can directly obtain the frames from the video file 312. In some cases, a determined number of frames can be requested, where additional requests can be made if a first set of additional frames still does not include all frames needed to decode or encode the frames of the subtask. In a particular implementation, the worker (such as the codec of a worker) can request specific byte ranges of a video file that correspond to the desired frames.

These operations of the worker 340 can optionally be carried out in conjunction with a media processor 344 of a given worker, where the media processor provides suitable data and operation instructions to the codec 348, and optionally acts on feedback provided from the codec (including feedback regarding additional frames that might be needed for decoding or encoding operations).

The orchestrator 324 can work with, or include the functionality of, a scheduler 328 in distributing subtasks to worker 340. The scheduler 328 can perform actions such as assigning subtasks to worker 340, monitoring the completion of subtasks, or adjusting the assignment of a subtask or the priority of individual subtasks of an overall task (and thus its constituent subtasks). Monitoring the completion of subtasks can include determining whether a worker 340 has failed, or if a result has not been provided within an expected timeframe. For instance, a worker 340 can send an acknowledgment to the coordinator system 320 when a subtask has been completed, the coordinator system can poll workers (to determine whether they are still "alive," or to determine a status of one or more subtasks assigned to a given worker), or the coordinator system can otherwise determine when a task has been completed, such as by monitoring a repository for the presence of units of video (such as segments or chunks) for particular subtasks.

Threshold times for task completion can be fixed times, or can vary, including for a particular task, particular subtasks of a task, or depending on properties of workers 340 to which subtasks are assigned. For instance, a task where video units of a ten-second duration are specified may be associated with a longer "timeout" threshold than a task where video units of a five-second duration are specified. Or, a video that has a comparatively high complexity may have a timeout threshold set that is longer than for a lower-complexity video. As another option, a worker can periodically renew a lease for a subtask (by communicating with the coordinator computing system), or can write checkpoints for the subtask. This signaling can indicate to the coordinator node that the worker is active/making progress. In some cases, the lack of lease renewal, or failure to write checkpoints, can serve as timeout criteria that can result in the coordinator computing system asking a subtask to another worker.

Timeout threshold can also vary depending on the nature of the operation or operations being applied during processing of the subtasks. For example, an operation to trim a video may be associated with shorter timeout values than an operation to apply an effect to all frames of a video.

As for timeout variations for different subtasks within a task, timeout thresholds can vary based on a complexity of a video portion being processed during a subtask, in a similar manner as described above for processing of different video files 312, or based on different operations being performed as part of different subtasks. Assume that a transition is being applied, and that only one, or a limited number, of subtasks include portions of the video that are relevant to the transition. Timeout values for subtasks associated with the transition can be set to a longer value than timeout values where portions of a video are being encoded in discrete video units, but no other alteration of the source video is specified.

Workers 340 can be of different types, which can affect timeout values set, and also can be considered when scheduling particular subtasks of one or more tasks. That is, while not required, disclosed techniques support heterogenous computing devices serving as workers 340. A given implementation of the computing environment 300 can include one or more workers 340 of each of one or more types, including where a single worker is present, and where that worker can be the coordinator system 320 or a worker that is a computing device separate from, but in communication with, the coordinator system.

Workers 340 can include codecs 348 that are implemented in software or in hardware. However, even workers 340 having a same type of implementation (software or hardware) for a codec 348 can differ in a variety of respects. For example, workers 340 can vary in form factor, where different form factors can be associated with classes of computing resources or availability. For instance, workers 340 can be in the form of mobile devices or tablet computers, which are typically limited to communicating via WIFI or cellular connections. Since these devices are mobile, it may be somewhat unpredictable when a given device will be available to the orchestrator 324 or the scheduler 328. On the other hand, laptops may be somewhat more likely to be available, and may be connected using WIFI or hardwired internet connections. Similarly, desktop computers are typically connected using WIFI or hardwired connections, and are typically more regularly available than even laptops. In some cases, it can be assumed that a desktop computer is always available as a worker 340, unless the computer is unexpectedly turned off, loses connectivity, or fails. Dedicated servers or cloud computing systems can also act as workers 340, and typically are not mobile, more available, and have greater connectivity with the coordinator computing system 320.

In addition to have different expected availability and connectivity, different worker devices 340 can often be classified into different classes or types, where one class or type is expected to have greater or fewer processing resources (memory, processing power) thant devices in another class or of another type. For instance, it can generally be assumed that dedicated servers or cloud computing systems will have greater resources than personal computers, which in turn will have greater resources than laptops, which may be expected to have greater resources than tablets, which may have greater resources than smartphones.

Even within a class or type of worker 340, there can be significant differences in available processing resources. For instance, a high-end gaming computer may have significantly more processing capacity and memory than a budget computer, as well potentially having a powerful GPU that may not be present on the budget computer. Similarly, smartphones can have processing resources that differ significantly based on the manufacturer, position within a given product line, or version.

The different types of workers 340 are illustrated in FIG. 3 as one or more workers 340a of a first type, one or more workers of a second type 340b, and one or more workers 340c of a third type, where the workers 340a, 340b, 340c all include software-based codecs 348. FIG. 3 also illustrates one or more workers 340d of a fourth type, having a hardware-based codec 348. While only a single type of worker 340 with a hardware-based codec 348 is shown, it should be appreciated that there can be different types of workers having hardware-based codecs, or the computing environment 300 may not include any workers with hardware-based codecs. Similarly, a computing environment 300 can include only workers 340 with hardware-based codecs.

Information regarding workers 340 can be maintained as resource information 332 of the coordinator system 320. The resource information 332 can be maintained as a separate list, repository, database, etc. from the orchestrator 324 or the scheduler 328, or can be part of the orchestrator or scheduler. The resource information 332 can be maintained in one or more instance of a data type, including an abstract or composite datatype (such as a class, including a vector class) or in one or more instances of a data structure (such as a stack, queue, heap, graph, tree, list, etc.). In a particular implementation, the resource information 332 can be maintained in a database, including in one or more tables or views of a relational database system.

In any event, the resource information 332 can identify workers 340 that are currently or potentially available to the coordinator system 320, and can provide details regarding such workers, such as an address (for example, an IP address or a MAC address). The resource information can also include details about a worker 340 such as an availability or reliability ranking or descriptive information, or information about computing resources available on a worker, which can be detailed for the particular worker, or can simply indicate a general type or class to which the worker belongs. Optionally, the resource information 332 can include information about subtasks currently assigned to a worker 340, or a log of subtasks previously executed by the worker (which can be a form of performance information that can be used when assigning subtasks to workers).

The scheduler 328, optionally in conduction with the orchestrator 324, can be responsible for assigning subtasks to workers, including using the resource information 332. That is, the orchestrator 324 can generate a plurality of subtasks for a given video processing task. The scheduler 328 can then schedule the subtasks to individual workers 340. Subtasks can be scheduled at the same time, or can be scheduled over time, including based on the execution of earlier-scheduled subtasks. As an example, consider a video processing task that is divided into one hundred subtasks. The one-hundred subtasks could be immediately scheduled to workers 340, where a given worker might be assigned a single subtask or multiple subtasks. Or, a subset of the subtasks can initially be scheduled (which can, but need not, be in a chronological order), and additional subtasks can later be scheduled, including scheduling additional subtasks to a worker 340 after it completes processing of an earlier-assigned subtask.

Different tasks or subtasks can be associated with differing priority levels, which can be fixed or can be adjusted over time. In the case of just in time coding, for example, subtasks corresponding to initial segments needed for video streaming may be prioritized, either compared with other subtasks of the same task or subtasks of a different task. Prioritization can include preempting subtasks of another task, or scheduling subtasks on more reliable or higher-throughput (or otherwise more performant) workers 340. As another example, higher-priority tasks, such as those associated with a particular user or use scenario (such as just in time coding), can cause processing of subtasks of lower-priority tasks to be delayed, or scheduled to different workers 340.

The coordinator system 320 can include a user interface (UI) or application program interface (UUI), or both, 336, which can be used for a variety of purposes, including to submit video processing tasks to the orchestrator 324. The UI/API 336 can also be used for other purposes, such as to define/modify the resource information 332 or to set properties of the scheduler 328, including stopping tasks/subtasks or changing the priority of a task/subtask. The UI/API 336 can receive commands from user/program interfaces 352 (where a program interface is a component of a program that makes calls to the API 336 of the coordinator system 320, and can perform other operations, such as providing an API to service streaming requests, such as from a streaming client 380). Although not shown, the client 304 can include a UI/PI 352, which can be part of, or can communicate with, the media application 308.

Processing of the subtasks produces processed video fragments 360. The processed video fragments 360 can be stored in a single location or at multiple locations, including storing all of the video fragments for a given task at each of multiple locations, or storing a portion of the video fragments for a given task at each of multiple locations. The location at which the processed video fragments 360 can be stored can include storing the processed video fragments at the client 304, at one of the workers 340 (see worker 340c), at the coordinator system 320, or at a variety of external locations 370 (where here an "external location" refers to a location that is not the client 304, the coordinator system 320, or a worker 340).

In a particular implementation, the external location 370 can be a repository used for streaming purposes, including for a plurality of video files, as represented by external location 370a. The external location 370a can optionally include server functionality 374 for processing streaming requests from streaming clients 380, having at least one media playback component 384 (such as a web browser). A given external location 370 can optionally include addition functionality, such as including one or both of the video file 312 or the UI/PI 352.

Example 5—Example Coordinator Computing System Operations

Figure 4:
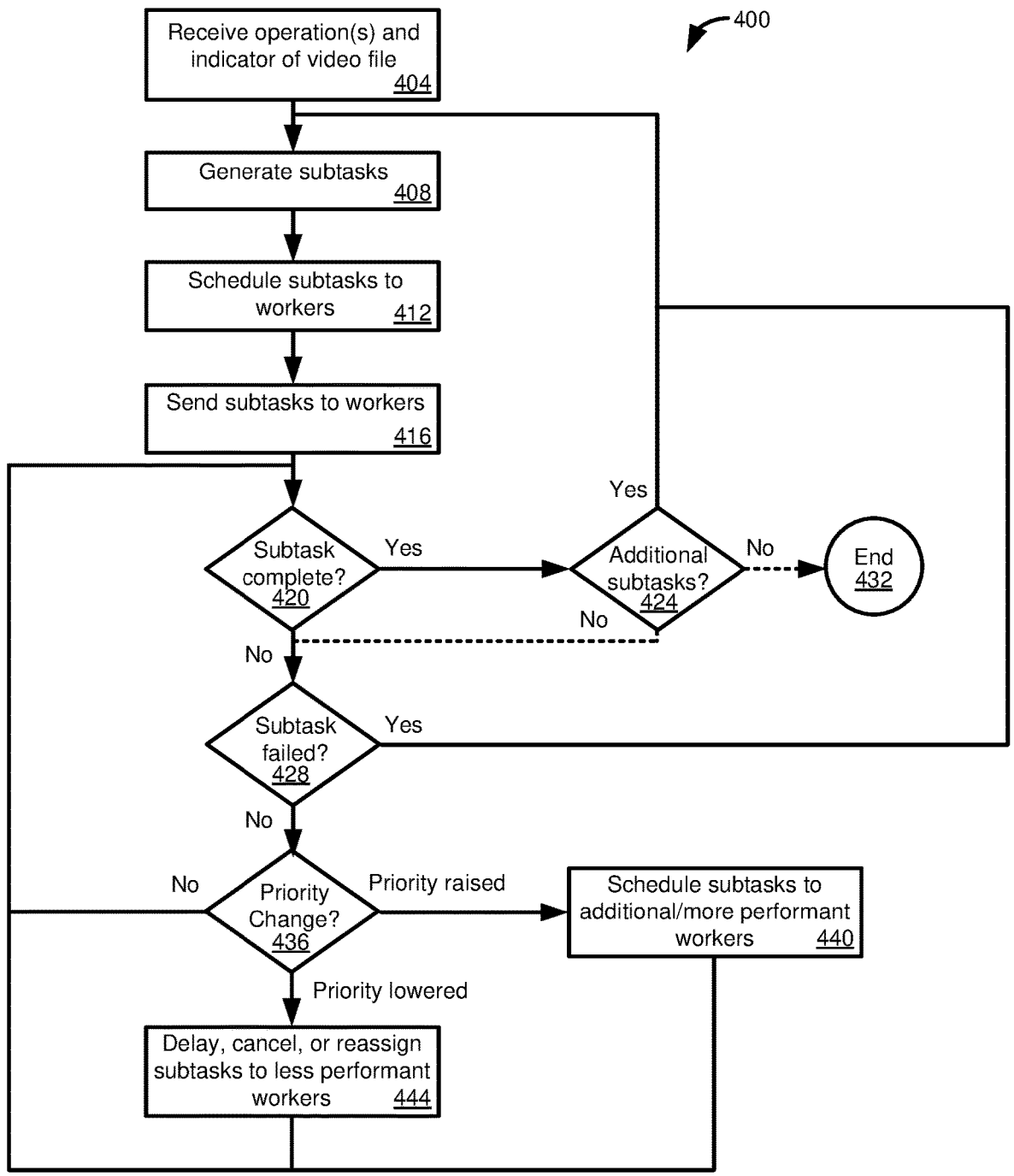
FIG. 4 is a video processing method performable by a coordinator computing system.

FIG. 4 illustrates operations in a method 400 that are performed by a coordinator computing system, such as the coordinator computing system 320 of FIG. 3, in a particular implementation of disclosed techniques. It should be appreciated that a method performed by a coordinator computing system is not limited to the operations in the method 400, as, for example, certain operations can be added, removed, or reordered compared with the illustrated method.

At 404, the coordinator computing system, such as with an orchestrator component, receives an indicator of one or more video files and an indicator of one or more operations to be performed on the one or more video files. The operations can include instructions to be carried out on the video files, and can optionally include data to be included in an output (one or more processed video fragments produced by a worker, which can include data to be included in all of the processed video fragments).

Video processing subtasks are generated by the coordinator computing system at 408, such as by the orchestration component. Generating the subtasks can include determining video fragments (such as segments or chunks) in a desired output, and then generating the subtasks. The subtask an include operations, video data (or information sufficient to retrieve such data), and optionally other information needed to perform that subtask such that the subtasks will produce the desired output. In particular, generating the subtasks can include operations such as determining a size/duration of processed video fragments, such that subtasks will produce processed video fragments that have a duration corresponding to a unit of streaming, such that the processed video fragments can be used for streaming without further processing (although computing elements needed for streaming, such as a manifest, may need to be generated before streaming can begin).

Video fragments that can be used for streaming without further processing can be referred to as being "streamable." "Streamable" can indicate processed video fragments having a single/common bitrate, such as a high resolution bitrate (although non-high resolution bitrates can also be used), or can refer to processed video fragments available in a plurality of bitrates (where typically each processed video fragment will be present at given bitrates of the plurality of bitrates), such as for adaptive streaming (which can provide a "bitrate ladder"). In the case where a single bitrate is used, particularly a high-resolution bitrate, the high-bitrate fragments can be encoded (such as using just in time coding techniques) to lower bitrates, if appropriate.

In addition to having a suitable duration for streaming, processed video fragments can have other properties that make them suitable for streaming without further processing, including media formatting, settings, or structuring. These properties include known properties of streaming video fragments, and include properties suitable for use in streaming protocols such as RTP, RTCP, RTSP, SIP and RSVP, as well as MPEG-DASH and HLS. For example, individual processed video fragments may be delivered in packets or segments that include header information in addition to video data. Specific examples of segment formats include ISO Base Media File Format (ISOBMFF, ".m4s" files) and MPEG-TS.

Subtasks can include some information that is common to all subtasks, while other information can be specific to a subset of subtasks, including for an individual subtask. As an example, a subtask can include a bitrate to be used in encoding all processed video fragments, or instructions for calculating a bitrate, where the same instructions can be applied for each subtask in the same way, even though a resulting bitrate may differ. The bitrate can correspond to a desired bitrate to be used for streaming purposes. As an aside, if it is desired to have video fragments available in multiple bitrates, this information can be included in subtasks for a single task (that is, "create processed video fragments at multiple bitrates"), or separate tasks can be created for each desired bitrate. Or, a single task can specify multiple bitrates to be used, and the coordinator computing system can generate different subtasks for each desired bitrate.

Subtasks can also include information that is specific to a particular subtask or a particular set of subtasks. Take the example of a filter. If the filter is to be applied to an entire video, then all subtasks can have instructions to apply the filter. If the filter is to only be applied to certain video fragments, the coordinator computing system can include filtering instructions only for subtasks that process video fragments where the filter is to be applied. In yet further implementations, all operations/instructions for a task are included in a subtask, and the workers can determine what operations/instructions apply to their subtask, or adapt the operations/instructions to their subtask.

The nature of the information included in a subtask can also depend on whether/what information is "pushed" to a worker, and what information is "pulled" by a worker in processing the subtask. Some protocols may allow for a video file, or particular portions of the video file (those portions needed to process a video fragment associated with a subtask), to be sent to a worker, while other protocols may not support payloads that are sufficiently large to include such information. Similarly, operations or metadata (including header information) can either be included in a subtask to be sent to a worker, or the worker can be provided with information sufficient to request and receive the needed information (for example, an identifier of a video file and information sufficient to determine what portion of the video is to be processed by the subtask).

The subtasks are scheduled to workers at 412. In scheduling the subtasks, a coordinator computing system can consult resource information to determine available/suitable workers. The coordinator computing system can consider factors such as performance information for workers (reliability, available computing resources) or a priority of the video processing task. Logic can also be set to determine whether all subtasks are to be scheduled at the same time (assuming sufficient resources are available), or if the subtasks are to be scheduled in batches, or scheduled using a particular number of workers, where additional subtasks are scheduled as subtasks are completed by workers.

At 416, the subtasks are sent to workers. Although shown occurring as a single process step, sending subtasks to workers can be performed iteratively/periodically, as described in the discussion of 412.

It is optionally determined at 420 whether any subtasks have completed. Subtask completion can be determined in a number of ways, such as by receiving a completion notification from a worker, by polling a worker, or by monitoring a location where processed file fragments are stored. If subtasks have completed, it can be determined at 424 whether any additional subtasks remain to be processed. If so, the method 400 can return to 412. If not the, method can continue at 428, or optionally can end at 432.

If no subtasks completed at 420, if step 420 was omitted, the method can optionally determine at 428 whether any subtasks have failed. Subtask failure can be determined in a number of ways, such as receiving a failure notification from a worker, polling a worker, not receiving an "alive" message from a worker, or a timeout value being exceeded. If a subtask has been determined to have failed, the method 400 can return to 412, where the subtask can be restarted at the same worker, or scheduled to a different worker. Otherwise, the method 400 can optionally proceed to 436.

At 436, it is determined whether any priority changes have been made to a task (which in turn can affect some or all of its subtasks), or to a particular set of one or more subtasks. If no priority change has occurred, the method 400 can continue to an earlier operation in the method 400, such as to 420, where it can be determined whether all subtasks have completed.

Otherwise, if a priority change has occurred at 436, the priority change can be to increase a priority of a task or a portion of its subtasks, or to decrease a priority of a task or a portion of its subtasks. If it is determined that a priority has increased, the method can proceed to 440. At 440, existing subtasks can be rescheduled to more performant workers, or all or a portion of any unscheduled/unsent subtasks can be scheduled/sent to workers. While shown as a separate operation at 440, in some cases, the method 400 can return to 412, and the operations described for 440 can be performed as part of the operations at 412. The method 400 can then proceed to an earlier operation in the method 400, such as to 420, where it can be determined whether all subtasks have completed If it is determined that a priority has decreased, the method can proceed to 444. At 444, existing subtasks can be delayed, cancelled, or reassigned to less performant workers. As with the operations at 440, the operations at 444 can also be performed as part of the operations 412. After processing at 444 (or 412), the method 440 can return to an earlier operation, such as to 420. Note that a priority can change multiple times during task processing. For instance, a priority may be lowered, but then raised if a higher-priority task completes, or vice-versa.

The various decisions 420, 428, 436 have been described as optional. In addition, it should be appreciated that the decisions 420, 428, 436 can occur in an order other than as shown, and optionally can be carried out concurrently.

Example 6—Example Worker Operations

As has been described, disclosed techniques involve splitting a video processing task for a video file into a plurality of video processing subtasks that can be performed by one or more worker devices, where a device that performs the splitting can also serve as a (or the) worker. Information sent to a worker by a coordinator computing system can be implemented in a number of ways, including based on implementation preference or based on constraints provided by underlying technologies. For example, disclosed techniques can be implemented with video data being "pushed" to workers, or having workers "pull" the needed video data from another location. However, messaging protocols used with particular video processing techniques may not, for example, support payloads of a size sufficient for the video data associated with a subtask to be pushed to a worker.

Similarly, while some information about a subtask, including operations or information about a video file/fragment to be processed, may be included in a message sent to a worker, other information about the operations or video file may need to be retrieved by the worker. For instance, in order to determine what portion of a video file a worker should request, the worker may need header information for a container in which the file is stored, such a MP4 header. The worker may receive information about a subtask, such as operations to be performed and information identifying a fragment of a video it is to process. The worker may then need to request header information for the video to determine how to format its request for data of the video fragment (such as a byte range request). The worker can then request the data for the video fragment.

Figure 5:
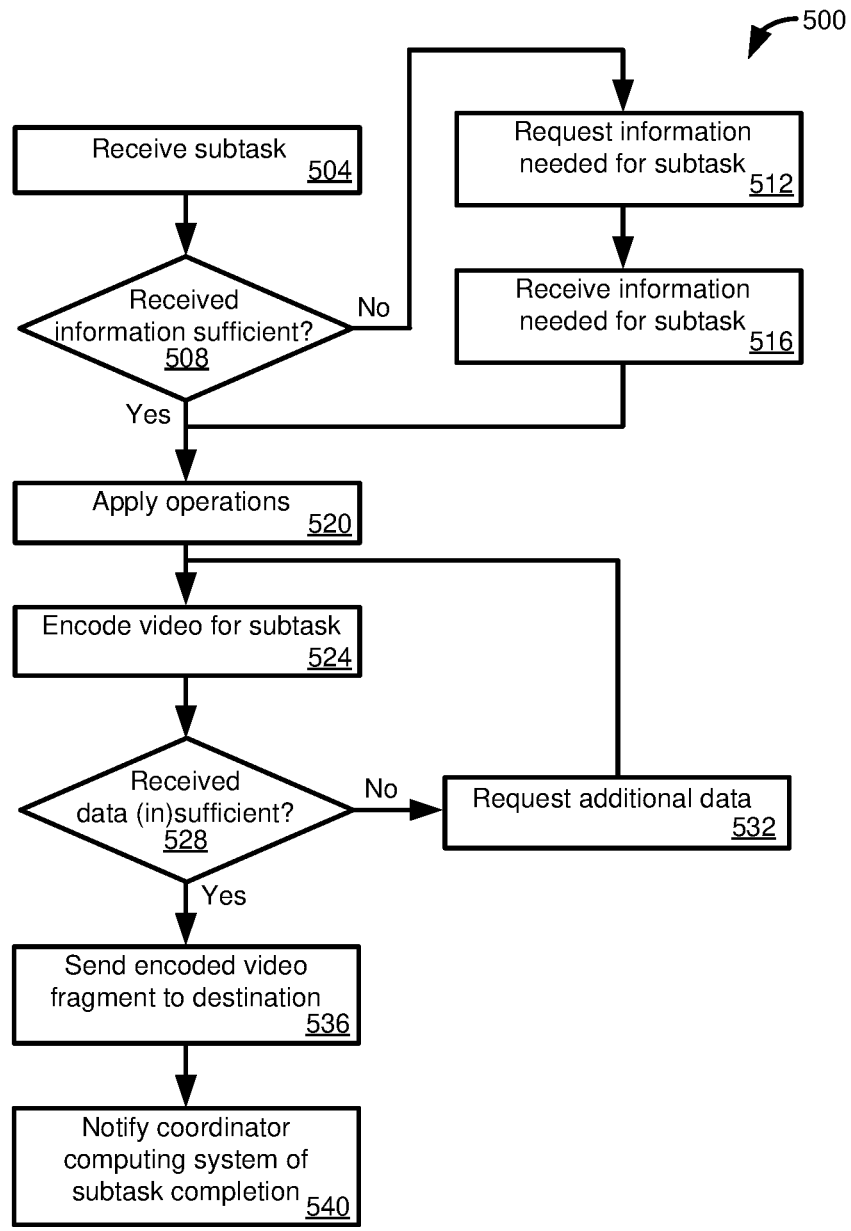
FIG. 5 is a video subtask processing method performable by a worker computing device.

FIG. 5 illustrates a flowchart of a method 500 that includes operations that can be included in the case of a "data pull," as well as "data push," but it should be appreciated that disclosed techniques can be implemented in other manners. The operations shown and described with respect to FIG. 5 can be implemented in the computing environment 300 of FIG. 3, including using the coordinator computing system 320 and one or more workers 340 (where the coordinator computing system can serve as a, or the, worker).

At 504, a worker receives, such as from a coordinator computing system, a subtask of a video processing request, such as in response to being sent the subtask at 416 of the method 400 of FIG. 4. Optionally, at 508 it is determined whether received information for the subtask is sufficient to process the subtask. If the information is sufficient, or if the implementation is such that all needed information is pushed to a worker, the method 500 can proceed to 520. Otherwise, the method 500 proceeds to 512, where the worker request information needed for processing the subtask. Or, if the implementation is such that it is known that a worker will need to request additional information to process a subtask, the method 500 can proceed directly from 504 to 512.

As has been described, in processing a subtask, a worker generally needs to have access to at least the video data associated with the video fragment associated with its subtask, operation information, and typically at least some metadata associated with a video file. Thus, if video data was not received by the worker in receiving the subtask at 504, the information received by the worker can have information sufficient for the worker to request the appropriate video data at 512. Such information can be a starting frame number and a number of frames to be processed, starting and ending frames, a starting frame and a duration of video to be processed, a starting and ending duration, a starting duration and a time window to process, a starting byte and byte size to request, a byte range to request, or other information or information useable to determine any of the previously listed types of information.

Details regarding instructions or operations to be performed as part of the subtask can also optionally be received along with the subtask at 504, or can be affirmatively requested by the worker at 512. For instance, a worker may be provided information regarding a portion of a video it is to process, and that it has been assigned to process the video portion, but it may request the actual instructions/operations to be performed, such as from a coordinator computing system. In some cases, the information received at 504 can simply be an indicator that a subtask has been assigned to the worker, where further details about the subtask (the video file, portion to be processed, instructions/operations to be executed) can be requested by the worker at 512.

All or a portion of metadata associated with a video file, or portion thereof, can also be sent in a subtask received by a worker at 504, or can be requested at 512. In particular, including depending on a protocol used to communicate with the worker, metadata, such as a MP4 header, may be needed by a worker to process a video file, and may or may not be included in the subtask received at 504. In particular, the header information may be needed by the worker in order to formulate a request for the portion of the video it is to process as part of the subtask. Such information can be requested at 512.

Information/data requested by the worker at 512 is received at 516. Although not shown, it should be appreciated that operations at 512 and 516 can be performed multiple times before the method 500 continues to other operations. In particular, a worker may make a first request for header information, determine what portion of a video file it needs to process the subtask, and then issue a separate request for the video data.

As indicated by the discussion above, a request for information can be sent to one or more recipients. For instance, some data (such as a MP4 header) may be requested from the coordinator computing system, while other data, such as video file data, may be requested from a repository storing the video file. Or, information about operations to be performed as part of a subtask can be requested (or received at 504) from a coordinator computing system, and then metadata (including a container header) and video data can be requested from a location, other than the coordinator computing system, where the video data is stored.

After receiving the requested information at 516, or if it was determined at 508 that the information received at 504 is sufficient to process the subtask, the method 500 proceeds to 520, where the worker applies the operations to the portion of the video data being processed by the worker for the subtask. The operations can include instructions to encode the video in a certain way, or to modify video content in some way, such as applying a filter, a transition, or adding text to the video content. The operations are provided to a video codec, which can decode data of the video file, apply the operations, and reencode the data at 524.

As part of the reencoding at 524 (or, as part of a coding operation, more generally), it may be determined that the worker does not have sufficient information. For instance, as described with respect to FIG. 2, the portion of the video data obtained by the worker may require frames that are not included in such video data. Accordingly, it can be determined at 528 whether the video data is sufficient for processing by an encoder/decoder. If not, the additional data can be requested at 532, and then the method can continue at 524. If the information is sufficient, or it is not determined that the information in insufficient (that is, 528 can determine that data is insufficient, rather than determining sufficiency), the method can proceed to 536.

At 536, an encoded (proceeded) video fragment is sent to a destination, where the destination can store all or a portion of processed video fragments for a task, and optionally the location can be a location from which such video fragments can be streamed. Optionally, at 540, the worker notifies a coordinator computing system that the subtask has been completed.

Example 7—Example Operations Implementing Disclosed Technologies

Figure 6:
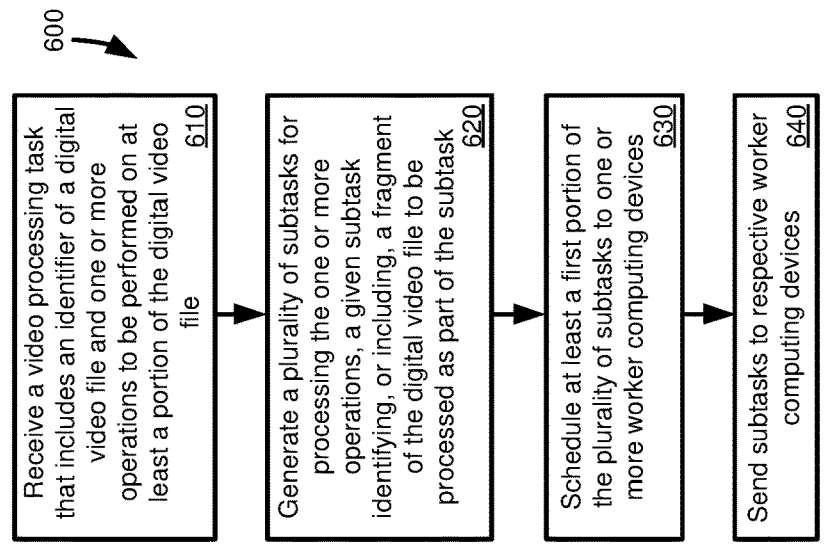
FIG. 6 is a flowchart of an example technique for generating video processing subtasks.

FIG. 6 illustrates a flowchart of a method 600 of dividing a video processing task into a plurality of subtasks performable by one or more worker computing devices. The method 600 can be implemented in the computing environment 300 of FIG. 3, and can include, or represent, operations in the method 400 of FIG. 4. In particular, the method 600 can be performed by the coordinator computing system 320 of FIG. 3.

At 610, a video processing task is received that includes an identifier of a digital video file and one or more operations to be performed on at least a portion of the digital video file. A plurality of subtasks are generated at 620 for processing the one or more operations. A given subtask of the plurality of subtasks identifies, or includes, a fragment of the digital video file to be processed as part of the subtask.

At 630, at least a first portion of the plurality of subtasks are scheduled to one or more worker computing devices. Subtasks of the at least a first portion of the plurality of subtasks are sent to respective worker computing devices at 640 to be processed by the respective worker computing devices, thereby providing improved fault tolerance for a video processing task as compared with executing the video processing task as a single task.

Figure 7:
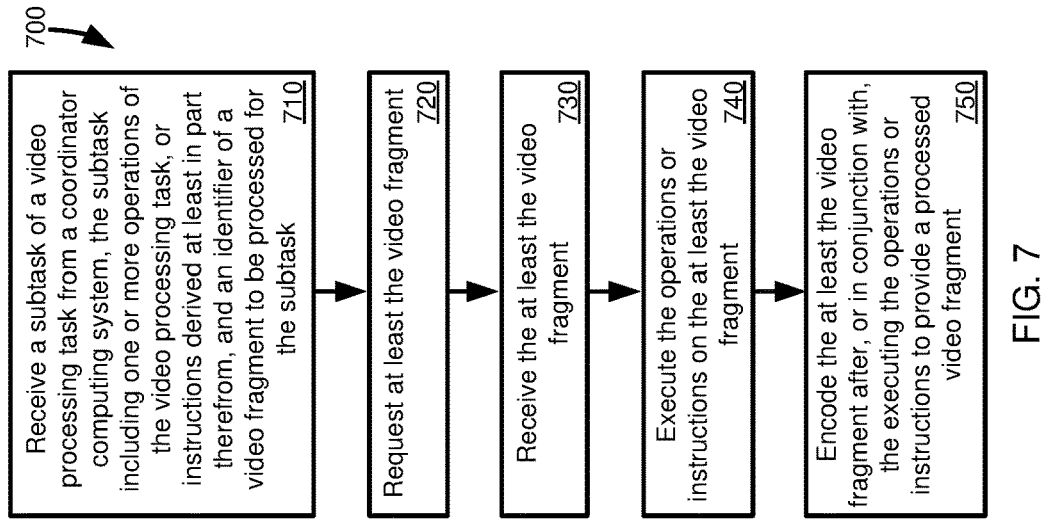
FIG. 7 is a flowchart of an example technique for carrying out a video processing subtask, where the subtask does not include video data to be processed by a worker computing device.

FIG. 7 illustrates a flowchart of a method 700 of executing a video processing subtask by a worker computing device. The method 700 can be implemented in the computing environment 300 of FIG. 3, and can include, or represent, operations in the method 500 of FIG. 5. In particular, the method 700 can be performed by a worker 340 of FIG. 3.

At 710, a subtask of a video processing task is received from a coordinator computing system. The subtask includes one or more operations of the video processing task, or instructions derived at least in part therefrom, and an identifier of a video fragment to be processed for the subtask. At least the video fragment is requested at 720. The at least the video fragment is received at 730. At 740, the operations or instructions are executed on the at least the video fragment. The at least the video fragment is encoded at 750 after, or in conjunction with, the executing the operations or instructions to provide a processed video fragment.

Figure 8:
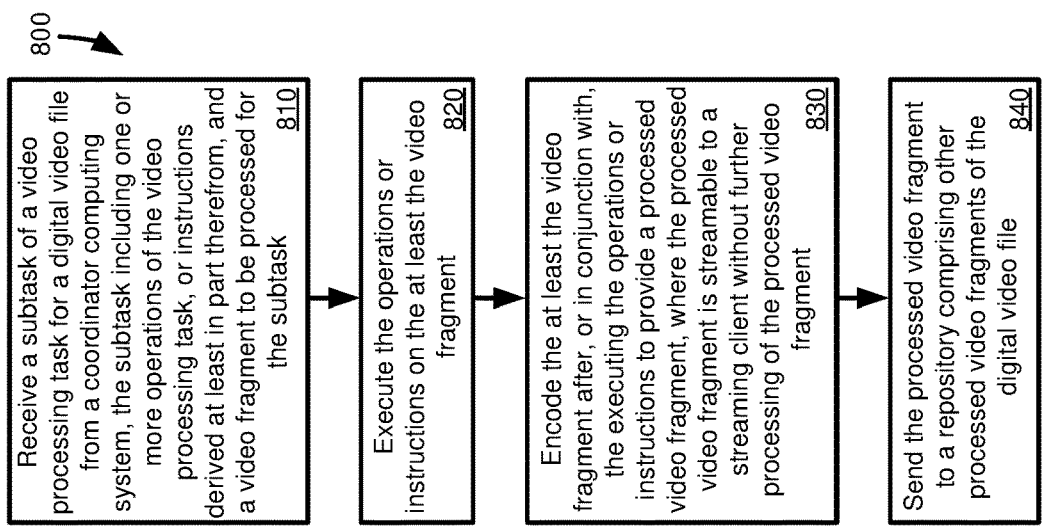
FIG. 8 is a flowchart of an example technique for carrying out a video processing subtask, where the subtask includes video data to be processed by a worker computing device.

FIG. 8 illustrates a flowchart of an alternate method 800 of executing a video processing subtask by a worker computing device. As with the method 700, the method 800 can be implemented in the computing environment 300 of FIG. 3, and can include, or represent, operations in the method 500 of FIG. 5. In particular, the method 700 can be performed by a worker 340 of FIG. 3.

At 810, a subtask of a video processing task is received from a coordinator computing system. The subtask includes one or more operations of the video processing task, or instructions derived at least in part therefrom, and a video fragment to be processed for the subtask. The operations or instructions are executed on the at least the video fragment at 820. At 830, the at least the video fragment is encoded after, or in conjunction with, the executing the operations or instructions to provide a processed video fragment. The processed video fragment is streamable to a streaming client without further processing of the processed video fragment. The processed video fragment is sent to a repository comprising other processed video fragments of the digital video file at 840.

Example 8—Additional Examples

Example 1 is a computing system that includes at least one memory and at least one hardware processor coupled to the at least one memory. The computing system further includes one or more computer-readable storage media storing computer executable instructions that, when executed, cause the computing system to perform various operations. The operations include receiving a video processing task that includes an identifier of a digital video file and one or more operations to be performed on at least a portion of the digital video file. A plurality of subtasks are generated for processing the one or more operations. A given subtask of the plurality of subtasks identifies, or includes, a fragment of the digital video file to be processed as part of the subtask.

At least a first portion of the plurality of subtasks are scheduled to one or more worker computing devices. Subtasks of the at least a first portion of the plurality of subtasks are sent to respective worker computing devices to be processed by the respective worker computing devices, thereby providing improved fault tolerance for a video processing task as compared with executing the video processing task as a single task.

Example 2 includes the subject matter of Example 1, and further specifies that the generating a portion of subtasks includes generating subtasks that will produce processed video fragments having a fixed duration.

Example 3 includes the subject matter of Example 2, and further specifies that the fixed duration is a duration that corresponds to a duration used for video streaming.

Example 4 includes the subject matter of any of Examples 1-3, and further specifies that the generating a portion of subtasks includes generating subtasks that will produce processed video fragments that are streamable without further processing of the processed video fragments.

Example 5 includes the subject matter of any of Examples 1-4, and further specifies that the scheduling at least a first portion of the plurality of subtasks includes scheduling the at least a first portion of the plurality of subtasks to a plurality of workers.

Example 6 includes the subject matter Example 5, and further specifies that workers of the plurality of workers have heterogenous processing capabilities.

Example 7 includes the subject matter of any of Examples 1-4, and further specifies that the scheduling at least a first portion of the plurality of subtasks includes scheduling the at least a first portion of the plurality of subtasks to a single worker.

Example 8 includes the subject matter of any of Examples 1-7, and further includes determining that execution of a subtask by a worker has failed, and restarting the subtask at the worker.

Example 9 includes the subject matter of any of Examples 1-6 or 8, and further includes determining that execution of a subtask by a worker has failed, scheduling the subtask to another worker, and sending the subtask to the another worker.

Example 10 includes the subject matter of any of Examples 1-6, 8, or 9, and further specifies that a request is received to increase a priority of the video processing task. A subtask of the plurality of subtasks is reassigned to a more performant worker computing device than a worker computing device to which the subtask was originally assigned. Or, additional subtasks of the plurality of subtasks are sent to additional worker computing devices.

Example 11 includes the subject matter of any of Examples 1-6 or 8-10, and further specifies that a request is received to decrease a priority of the video processing task. Execution of one or more subtasks of the plurality of subtasks is delayed or cancelled. Or, a subtask of the plurality of subtasks is reassigned to a less performant worker computing device than a worker computing device to which the subtask was originally assigned.

Example 12 includes the subject matter of any of Examples 1-11, and further specifies determining that a first subtask of the at least a portion of the plurality of subtasks has completed. A second subtask, not comprised within the at least a portion of the plurality of subtasks, is sent to a worker computing device.

Example 13 includes the subject matter of any of Examples 1-12, and further specifies that the sending the subtask includes sending subtask information including the one or more operations, or instructions derived at least in part therefrom, and video data to be processed by the respective worker computing device for a respective subtask of the at least a first portion of the plurality of subtasks.

Example 14 includes the subject matter of any of Examples 1-13, and further specifies that the sending the subtask includes sending subtask information including the one or more operations, or instructions derived at least in part therefrom, and a time associated with a beginning of a respective fragment of the digital video file.

Example 15 includes the subject matter of any of Examples 1-14, and further specifies that the sending the subtask includes sending subtask information including the one or more operations, or instructions derived at least in part therefrom, and a frame associated with a beginning of a respective fragment of the digital video file.

Example 16 includes the subject matter of any of Examples 1-15, and further specifies that the sending the subtask includes sending subtask information comprising the one or more operations, or instructions derived at least in part therefrom, and a header for the digital video file.

Example 17 includes the subject matter of any of Examples 1-16, and further specifies that a request is received to stream at least one processed video fragment produced by a worker computing device from a subtask. The at least one processed video fragment is sent to a streaming client in response to the request.

Example 18 is a method that can be implemented in hardware, software, or a combination thereof. A subtask of a video processing task is received from a coordinator computing system, the subtask includes one or more operations of the video processing task, or instructions derived at least in part therefrom, and an identifier of a video fragment to be processed for the subtask. At least the video fragment is requested and received. The operations or instructions are executed on the at least the video fragment. The at least the video fragment is encoded after, or in conjunction with, the executing the operations or instructions to provide a processed video fragment.

Example 19 includes the subject matter of Example 18, and further specifies that the processed video fragment is streamable to a streaming client without further processing of the processed video fragment.

Example 20 is one or more computer-readable media storing computer-executable instructions that, when executed, cause the computing system to perform various operations. The operations include receiving a subtask of a video processing task for a digital video file from a coordinator computing system. The subtask includes one or more operations or instructions of the video processing task, or instructions derived at least in part therefrom, and a video fragment to be processed for the subtask. The operations or instructions are executed on the at least the video fragment. The at least the video fragment is encoded after, or in conjunction with, the executing the operations or instructions to provide a processed video fragment. The processed video fragment is streamable to a streaming client without further processing of the processed video fragment. The processed video fragment is sent to a repository comprising other processed video fragments of the digital video file.

Example 9—Computing Systems

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing the features described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970, including input devices, output devices, and communication connections for interacting with a user. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way, and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 10—Cloud Computing Environment

Figure 10:
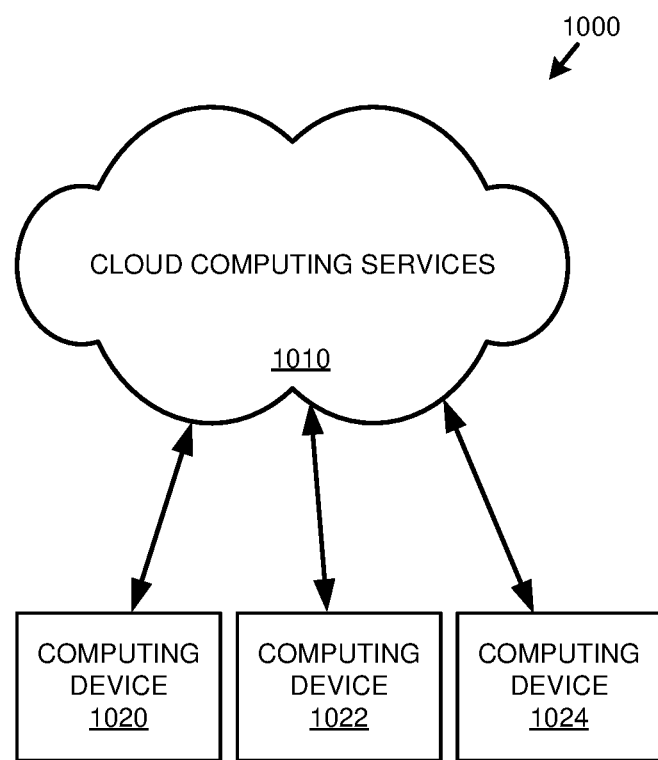
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

Example 11—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   at least one hardware processor coupled to the at least one memory; and
   one or more computer readable storage media storing computer-executable instructions, that when executed, cause the computing system to perform video processing operations that provide improved computing flexibility and fault tolerance, the operations comprising:
   receiving a video processing task comprising an identifier of a digital video file and one or more operations to be performed on at least a portion of the digital video file, wherein the task specifies a fixed duration of video fragments to be produced as a result of the one or more operations;
   generating a plurality of subtasks for processing the one or more operations, a given subtask of the plurality of subtasks identifying, or comprising, a fragment of the digital video file comprising multiple frames of the digital video file to be processed as part of the subtask, and the given subtask defining an output of a processed video fragment that has the fixed duration;

scheduling at least a first portion of the plurality of subtasks to one or more worker computing devices; and sending subtasks of the at least a first portion of the plurality of subtasks to respective worker computing devices to be processed by the respective worker computing devices, thereby providing that output of the given subtasks is streamable without further processing of the processed video fragments to alter a duration of the output, avoiding additional coding steps, thus reducing computer resource use, reducing video processing time, or providing improved video quality.

2. The computing system of claim 1, wherein the scheduling at least a first portion of the plurality of subtasks comprising scheduling the at least a first portion of the plurality of subtasks to a plurality of workers.

3. The computing system of claim 2, wherein workers of the plurality of workers have heterogenous processing capabilities.

4. The computing system of claim 1, wherein the scheduling at least a first portion of the plurality of subtasks comprises scheduling the at least a first portion of the plurality of subtasks to a single worker.

5. The computing system of claim 1, the operations further comprising:
receiving a request to increase a priority of the video processing task; and
(1) reassigning a subtask of the plurality of subtasks to a more performant worker computing device than a worker computing device to which the subtask was originally assigned; or
(2) sending additional subtasks of the plurality of subtasks to additional worker computing devices.

6. The computing system of claim 1, the operations further comprising:
receiving a request to decrease a priority of the video processing task; and
(1) delaying or cancelling execution of one or more subtasks of the plurality of subtasks; or
(2) reassigning a subtask of the plurality of subtasks to a less performant worker computing device than a worker computing device to which the subtask was originally assigned.

7. The computing system of claim 1, the operations further comprising:
determining that a first subtask of the at least a portion of the plurality of subtasks has completed; and
sending a second subtask, not comprised within the at least a portion of the plurality of subtasks, to a worker computing device.

8. The computing system of claim 1, wherein the sending the subtask comprises sending subtask information comprising the one or more operations, or instructions derived at least in part therefrom, and video data to be processed by the respective worker computing device for a respective subtask of the at least a first portion of the plurality of subtasks.

9. The computing system of claim 1, wherein the sending the subtask comprises sending subtask information comprising the one or more operations, or instructions derived at least in part therefrom, and a time associated with a beginning of a respective fragment of the digital video file.

10. The computing system of claim 1, wherein the sending the subtask comprises sending subtask information comprising the one or more operations, or instructions derived at least in part therefrom, and a frame associated with a beginning of a respective fragment of the digital video file.

11. The computing system of claim 1, wherein the sending the subtask comprises sending subtask information comprising the one or more operations, or instructions derived at least in part therefrom, and a header for the digital video file.

12. The computing system of claim 1, further operations further comprising:
receiving a request to stream at least one processed video fragment produced by a worker computing device from a subtask; and
sending the at least one processed video fragment to a streaming client in response to the request.

13. The computing system of claim 1, the operations further comprising:
subsequent to the sending subtasks, receiving a request from a respective worker device requesting frames of the digital video file; and
sending frames of the digital video file to the respective worker device in response to the request.

14. The computing system of claim 13, wherein the frames of the digital video file send to the respective worker device in response to the request are frames outside of the fixed duration of the subtask of the respective worker device.

15. The computing system of claim 1, the operations further comprising:
subsequent to the sending subtasks, receiving a request from a respective worker device requesting metadata the digital video file; and
sending the metadata of the digital video file to the respective worker device in response to the request.

16. The computing system of claim 1, wherein the metadata comprises a header of the digital video file.

17. A method that causes a computing system to perform video processing operations that provide improved computing flexibility and fault tolerance, the computing system comprising at least one memory and at least one hardware processor coupled to the at least one memory, the method comprising:
receiving a video processing task comprising an identifier of a digital video file and one or more operations to be performed on at least a portion of the digital video file, wherein the task specifies a fixed duration of video fragments to be produced as a result of the one or more operations;
generating a plurality of subtasks for processing the one or more operations, a given subtask of the plurality of subtasks identifying, or comprising, a fragment of the digital video file comprising multiple frames of the digital video file to be processed as part of the subtask, and the given subtask defining an output of a processed video fragment that has the fixed duration;
scheduling at least a first portion of the plurality of subtasks to one or more worker computing devices; and
sending subtasks of the at least a first portion of the plurality of subtasks to respective worker computing devices to be processed by the respective worker computing devices, thereby providing that output of the given subtasks is streamable without further processing of the processed video fragments to alter a duration of the output, avoiding additional coding steps, thus reducing computer resource use, reducing video processing time, or providing improved video quality.

18. The method of claim 17, further comprising:
subsequent to the sending subtasks, receiving a request from a respective worker device requesting frames of the digital video file or metadata of the digital video file; and
sending the frames or metadata of the digital video file to the respective worker device in response to the request.

19. One or more non-transitory computer-readable storage media comprising:
computer-executable instructions that, when executed by a computing system comprising at least one memory and at least one hardware processor coupled to the at least one memory, cause the computing system to receive a video processing task comprising an identifier of a digital video file and one or more operations to be performed on at least a portion of the digital video file, wherein the task specifies a fixed duration of video fragments to be produced as a result of the one or more operations;
computer-executable instructions that, when executed by the computing system, cause the computing system to generate a plurality of subtasks for processing the one or more operations, a given subtask of the plurality of subtasks identifying, or comprising, a fragment of the digital video file comprising multiple frames of the digital video file to be processed as part of the subtask, and the given subtask defining an output of a processed video fragment that has the fixed duration;
computer-executable instructions that, when executed by the computing system, cause the computing system to schedule at least a first portion of the plurality of subtasks to one or more worker computing devices; and
computer-executable instructions that, when executed by the computing system, cause the computing system to send subtasks of the at least a first portion of the plurality of subtasks to respective worker computing devices to be processed by the respective worker computing devices, thereby providing improved fault tolerance for a video processing task as compared with executing the video processing task as a single task;
wherein execution of the above computer-executable instructions causes the computing system to perform video processing operations that provide that output of the given subtasks is streamable without further processing of the processed video fragments to alter a duration of the output, avoiding additional coding steps, thus reducing computer resource use, reducing video processing time, or providing improved video quality.

20. The one or more non-transitory computer-readable storage media of claim 19, further comprising:
computer-executable instructions that, when executed by the computing system, cause the computing system, to subsequent to the sending subtasks, receive a request from a respective worker device requesting frames of the digital video file or metadata of the digital video file; and
computer-executable instructions that, when executed by the computing system, cause the computing system to send the frames or metadata of the digital video file to the respective worker device in response to the request.

* * * * *